(12) United States Patent
Doerr (10) Patent No.: US 7,903,913 B2
(45) Date of Patent: Mar. 8, 2011

(54) OPTICAL APPARATUS (75) Inventor: Christopher Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/184,889

(22) Filed: Aug. 1, 2008

(65) Prior Publication Data

US 2010/0027939 A1    Feb. 4, 2010

(51) Int. Cl.
  *G02B 6/26*    (2006.01)
(52) U.S. Cl. .............. 385/46; 385/15; 385/28; 385/37; 385/42; 385/43; 385/44; 385/45; 385/47; 385/129; 385/130; 385/131; 385/132
(58) Field of Classification Search ............... 385/28, 385/42–47, 37, 129–132, 15
See application file for complete search history.

(56) References Cited

U.S. PATENT DOCUMENTS

| | | | | |
|---|---|---|---|---|
| 3,932,023 A * | 1/1976 | Humer | ............ | 385/35 |
| 5,365,538 A * | 11/1994 | Tumminelli et al. | ........... | 372/66 |
| 5,745,618 A * | 4/1998 | Li | .................. | 385/46 |
| 5,809,184 A * | 9/1998 | Doerr et al. | ................... | 385/11 |
| 6,049,644 A * | 4/2000 | Dragone | ......................... | 385/37 |
| 6,181,849 B1 * | 1/2001 | Lin et al. | ......................... | 385/24 |
| 6,181,856 B1 * | 1/2001 | Brun | ............................. | 385/52 |
| 6,201,913 B1 * | 3/2001 | Yi et al. | ......................... | 385/42 |
| 6,208,791 B1 * | 3/2001 | Bischel et al. | ............... | 385/129 |
| 6,282,344 B1 * | 8/2001 | Bergmann et al. | ............. | 385/46 |
| 6,374,013 B1 * | 4/2002 | Whiteaway et al. | ........... | 385/37 |
| 6,684,009 B2 * | 1/2004 | Ueda | ............................. | 385/37 |
| 7,187,817 B2 * | 3/2007 | Anton et al. | ...................... | 385/14 |
| 7,268,868 B2 * | 9/2007 | Kiesel et al. | ................... | 356/301 |
| 7,330,614 B1 * | 2/2008 | Mossberg et al. | ............... | 385/14 |
| 7,382,953 B1 * | 6/2008 | Bulthuis et al. | ................ | 385/37 |
| 2006/0148103 A1 * | 7/2006 | Chen et al. | .................... | 436/524 |

* cited by examiner

*Primary Examiner* — Brian M. Healy
*Assistant Examiner* — Guy G Anderson
(74) *Attorney, Agent, or Firm* — Brosemer, Kolefas & Associates, LLC (57) ABSTRACT

An optical apparatus including a 360-degree star coupler with derivative structure(s) and applications to optical imaging, optical communications and optical spectroscopy.

31 Claims, 11 Drawing Sheets

OPTICAL APPARATUS

FIELD OF THE INVENTION

This invention is directed to an optical imaging apparatus and in particular to a 360-degree star coupler and derivative structures/devices thereof with application to optical imaging, optical spectroscopy and/or optical communications.

BACKGROUND OF THE INVENTION

A wide variety of optical apparatuses have been employed in the fields of imaging, telecommunications, and medicine—to name a few. Consequently, new optical apparatuses which may advantageously impact these fields are desired.

SUMMARY OF THE INVENTION

An optical apparatus including a 360-degree star coupler is described and applied to optical imaging and spectroscopy.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

By way of some additional background, it may be appreciated that in an imaging system using conventional lenses, the resolution is limited to a feature size of approximately $\lambda/NA$, where $\lambda$ is the wavelength in the material, and NA is the numerical aperture. As is known, the NA is related to the capture angle of the lens, and the maximum achievable NA from a conventional lens is ~0.9.

One reason that the resolution is limited is because objects that are significantly smaller than a wavelength scatter light in all directions. Only part of the scattered light can be collected using a conventional lens. The inability to collect all the scattered light from small features results in information loss that unfortunately prevents resolving such features. By analogy, this situation is like trying to capture a high-speed signal using a band-limited detector.

According to an aspect of the present invention, an optical apparatus is provided which surrounds the object imaged thereby permitting the collection of all scattered light. Advantageously, image features smaller than a wavelength may be resolved while operating in the far field portion of the spectrum and over a wide wavelength range, limited only by the accuracy with which the inverse scattering problem can be solved.

Figure 1A:
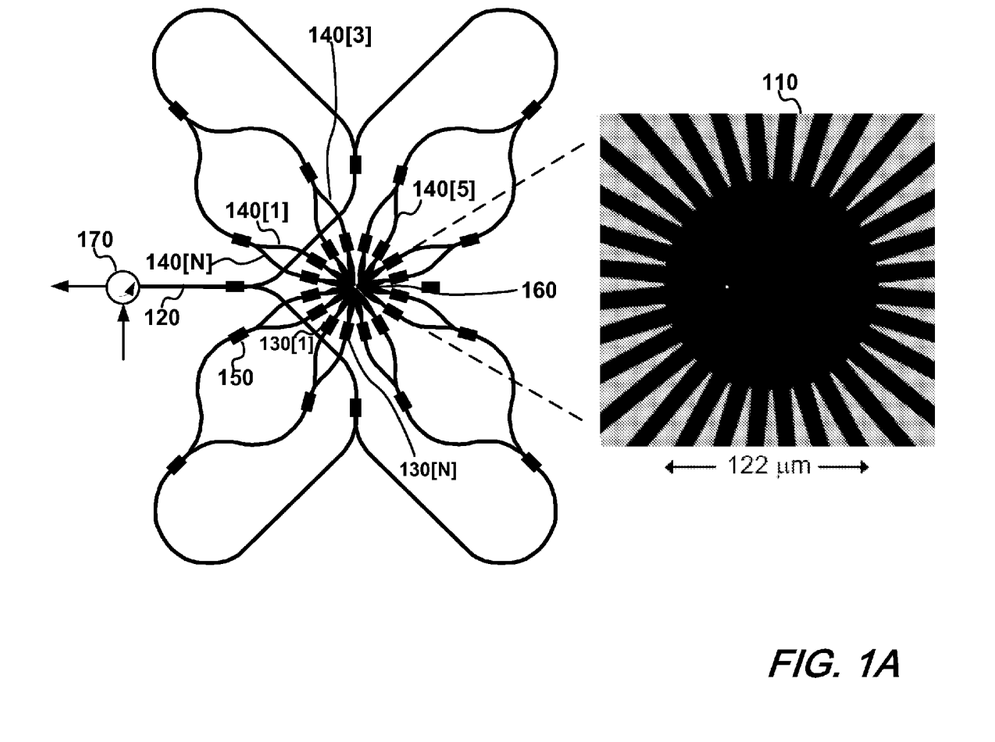
FIG. 1A and FIG. 1B are schematic diagrams of an optical arrangement according to an aspect of the present invention with inset (1A) showing a planar lightwave circuit of central structure (1B)
Figure 1B:
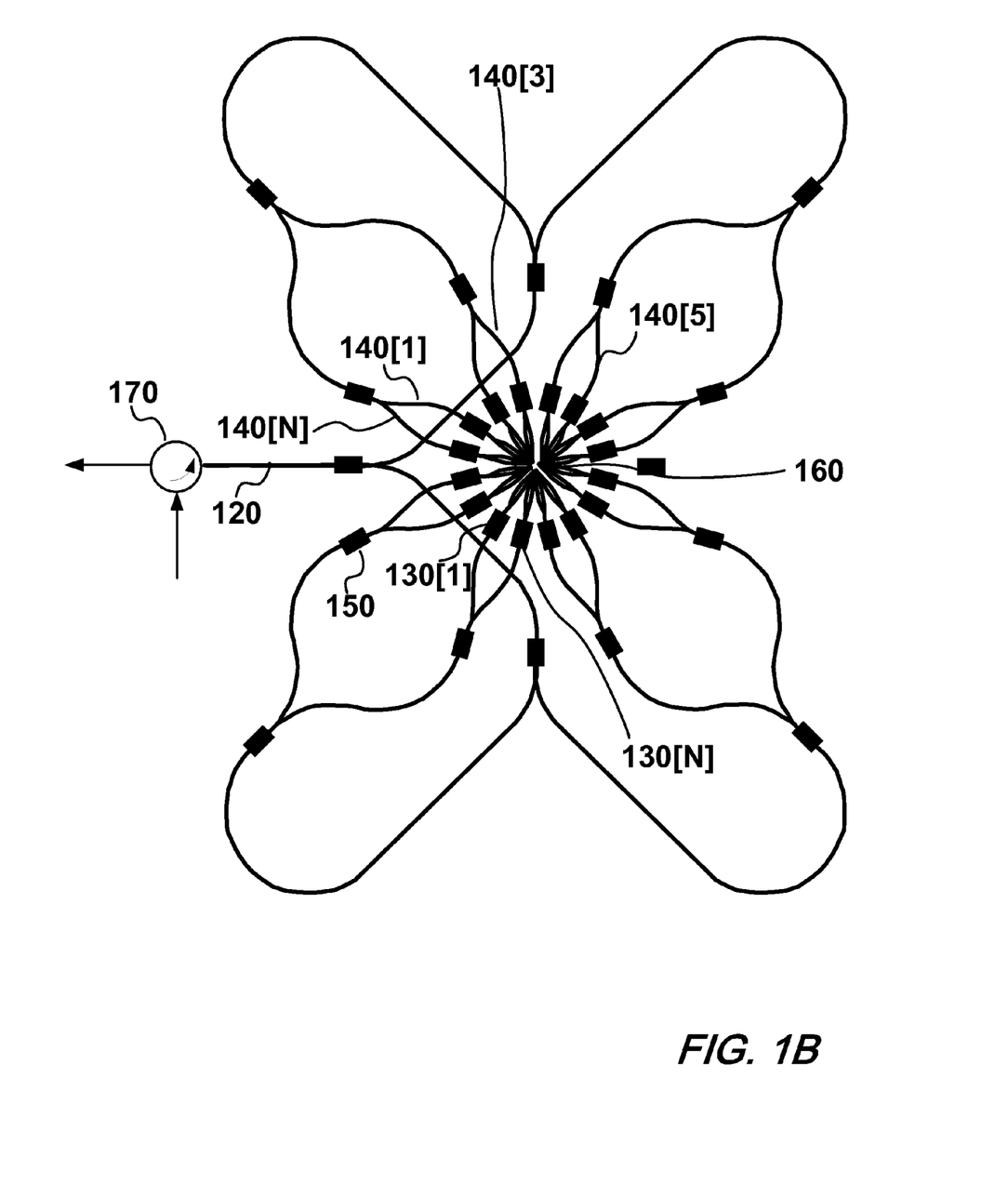

With initial simultaneous reference to FIG. 1A and FIG. 1B, there is shown a planar lightwave circuit (PLC) 100, according to an aspect of the present invention. The central portion of the PLC comprises a star coupler 110 (See, e.g., Dragone, U.S. Pat. No. 6,195,482 the entire contents of which are incorporated by reference as if set forth at length) having a 360° capture angle—i.e., a "360° star". As shown, an input/output waveguide 120 optically feeds all the inlets 130[1] . . . 130[n] of the 360° star via waveguides having equal path lengths 140[1] . . . 140[i] through the effect of a series of cascaded of y-branch couplers 150.

Shown in FIGS. 1A and 1B, a small aperture 160 is positioned in the middle of the star coupler 110. An object (not specifically shown) to be imaged (or measured or spectroscopically analyzed or simply counted) is placed in the aperture 160. Operationally, light enters through the input/output waveguide 120, enters the 360° star 110, focuses at the center of the 360° star 110 where it is absorbed/scattered by the object positioned within the aperture 160 and after scattering exits the 360° star 110, and is conveyed out of the PLC via input/output waveguide 120. An optical circulator 170 may be employed to separate the outgoing light from the incoming light. Thermooptic phase shifters 175[1] . . . 175[4] are positioned on four of the long waveguides which may be used to correct/adjust fabrication-induced phase errors. Of course, those skilled in the art will readily understand that different types/number of phase shifters may be employed as different fabrication techniques are employed while constructing devices according to these aspects of the present invention.

As the object is moved within the aperture 160, transmissivity measurements may be performed and recorded and thereby used to interpret the image of the object. In the configuration shown, the connecting waveguides exhibit equal path length(s), and therefore the imaging is wavelength-insensitive.

As noted previously, each of the individual waveguide light paths 140[1] . . . 140[n] which branch from the input/output waveguide 120 through the effect of the plurality y-branch couplers 150 have equal path lengths. In a preferred embodiment, each of the y-branch couplers 150 will exhibit the same 50/50 splitting/coupling ratios, although particular variations may be possible depending upon the application of the overall apparatus. When configured in this manner wherein each of the branch couplers 150 have the same coupling ratio(s) and the path lengths of each waveguide 140[1] . . . 140[n] is the same, imaging resulting from this "flower" structure is advantageously wavelength insensitive.

At this point, consider only electric fields polarized perpendicular to the plane of the PLC 100. If the vertical guidance is weak, then this corresponds to transverse magnetic (TM) polarization. As a result, the coupler inlets 130[1] . . . 130[n] create an approximately cylindrical wave that propagates into the center of the star coupler (not specifically shown—but substantially at aperture 160), passes through the center, and re-enters the inlets 130[1] . . . 130[n]. For a continuous-wave input with frequency ω, this creates a standing wave with a field distribution (using complex notation), $$\overline{E}(r, \phi) = \hat{z} J_0(kr) \quad [1]$$

where k is the propagation constant in the slab waveguide and r and φ are the polar coordinates from the star coupler center. With a finite number of star coupler inlets P, Eq. [1] holds true for only the center diffraction zone, which has a diameter of P/k. As in an arrayed waveguide grating (AWG), the stronger the mutual coupling between the inlets, the less power appears in the higher diffraction orders.

In a conventional lensing system, NA≈4/(kD), where D is the 1/e² width of the focal spot. For the 360° star such as that which is an aspect of the present invention, a first impression might be that the Bessel function in Eq. [1] is the "focal" spot, which results in NA=1.14. This is only slightly better than the best conventional lenses, which is disappointing. However, upon further investigation one finds that this definition of NA is not applicable to an omnidirectional system like the 360° star.

Now, consider an example whereby a perfectly conducting cylinder having radius a is positioned with its center at a distance d from the center of the 360° star, which has radius R. The exact transmissivity of the device may then be analytically calculated using—for example—scattering theory.

We know from the above that in the absence of the conducting cylinder, the field in the free-space region is $J_0(kr)$. Let us change coordinate system from a polar one centered at the 360° star center to a polar one centered at the cylinder center by expanding it in an orthonormal basis set.

$$J_0(kr) \Rightarrow \sum_{m=-\infty}^{\infty} c_m J_m(kr') \exp(jm\phi') \quad [2]$$

where $$c_m = \frac{\int_{-\pi}^{\pi} \int_{-\infty}^{\infty} J_0(k|re^{j\phi} + d|) J_m(kr) \exp(jm\phi) dr d\varphi}{\int_{-\pi}^{\pi} \int_{-\infty}^{\infty} [J_m(kr)]^2 dr d\varphi} \quad [3]$$

The scattered field from the cylinder must be a circular, out-going wave centered on the cylinder and thus has the form:

$$\sum_{m=-\infty}^{\infty} b_m H_m^{(1)}(kr') \exp(jm\phi') \quad [4]$$

The only reflection in the system is the cylinder, so the total field must be the field given by [2] plus the field given by [4]. To find the constants $b_m$, we use the condition that the field must be zero on the cylinder boundary, r'=a. Thus the total field in the star coupler is $$\overline{E}(r', \phi') = \hat{z} \sum_{m=-\infty}^{\infty} c_m \left[ J_m(kr') - \frac{J_m(ka)}{H_m^{(1)}(ka)} H_m^{(1)}(kr') \right] \exp(jm\phi') \quad [5]$$

Thus the power transmissivity through the flower (from the input/output waveguide back to the input/output waveguide) is $$T = \left| \sum_{p=1}^{P} E[|Re^{j2\pi p/P} - d|, \angle(Re^{j2\pi p/P} - d)] - \frac{H_0^{(2)}(kR)}{2} \right|^2 \quad [6]$$

where we subtracted off the wave coming from the inlets into the free-space region using the latter term in (6) so that we are left with just the wave re-entering the inlets.

Figure 2:
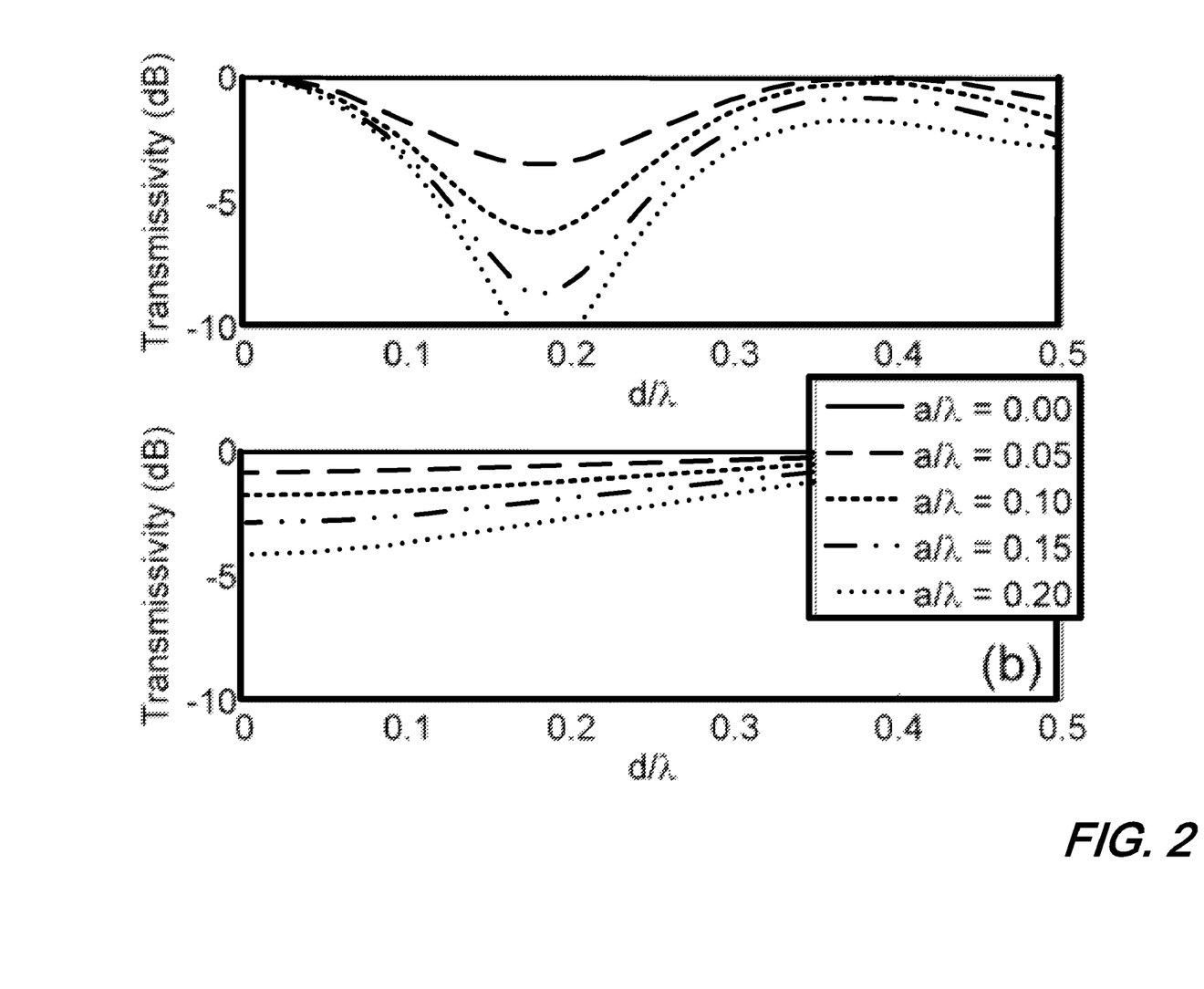
FIG. 2 is set of a plots of transmissivity vs. displacement d from the center for perfectly conducting cylinders of various radii a for (a) the flower and (b) a conventional imaging system having NA=0.9.

FIG. 2(a) shows a plot of T vs. d/λ for various a/λ. P=16 and R=30/λ, but any P>~4 and any R>~5/λ gives substantially the same plots. When a=0 (i.e., no cylinder) T=0 dB for all d. When the cylinder is at the star center (d=0), T=0 dB, which is expected because the incoming wave is reflected intact back to the inlets. As the cylinder is moved away from the origin, T shows a significant dip, even for radii as small as 0.05λ. Note that this is not direct imaging, and some signal processing would be needed in order to reconstruct the image, just as it is in other interferometric imaging systems.

Compare this to a conventional lens system, where a long cylinder of radius a is moved through the focal spot of a two-lens system with linearly polarized beams. FIG. 2(b) shows a plot of T vs. d (d is shortest distance from the focal center to the cylinder axis) for various a for such a system, assuming lenses with NA=0.9 and a Gaussian beam.

As one can see, the conventional imaging system cannot reasonably detect cylinders with a <~0.15λ. If we consider a 3-dB drop in transmissivity as a positive detection, then the 360° star imaging system can detect perfectly conducting cylinders ~4 times smaller in radius than a conventional imaging system. If we consider a 1-dB drop as positive detection, then the flower detects cylinders ~9 times smaller in radius than a conventional imaging system.

Unfortunately, as is well known in scattering theory we presently are unable to find a reasonable analytic solution for more complicated structures, such as two perfectly conducting cylinders. This is due—in part—because such structures exhibit scattering of scattering light.

Note that for the TM-polarized light case analyzed above, the beam at the 360° star focus is like a focused beam with a purely longitudinal polarization. Those skilled in the art will appreciate that such a polarization gives the smallest focal spot in conventional imaging, obtained by starting with a radially polarized beam.

A PLC flower—such as that shown schematically in FIG. 1.—was constructed in 0.8%-index-step silica waveguides on a silicon substrate—substantially using the layout shown in that figure wherein the number of inputs, P is 32. Thermooptic phase shifters were positioned on four of the waveguides at the top and bottom in FIG. 1 to correct any fabrication-induced phase errors.

To access the center of the 360° star and create an aperture, a slot was cut through part of the PLC using a dicing saw with a width of ~20 μm and a depth of ~125 μm, starting from the right-hand side and stopping the cut just after passing through the star center. Unfortunately, such sawing damages one or more of the inlets, so in the future alternatives—i.e., etch a circular hole in the center of the 360° star—may be employed to minimize any damage.

Figure 3A:
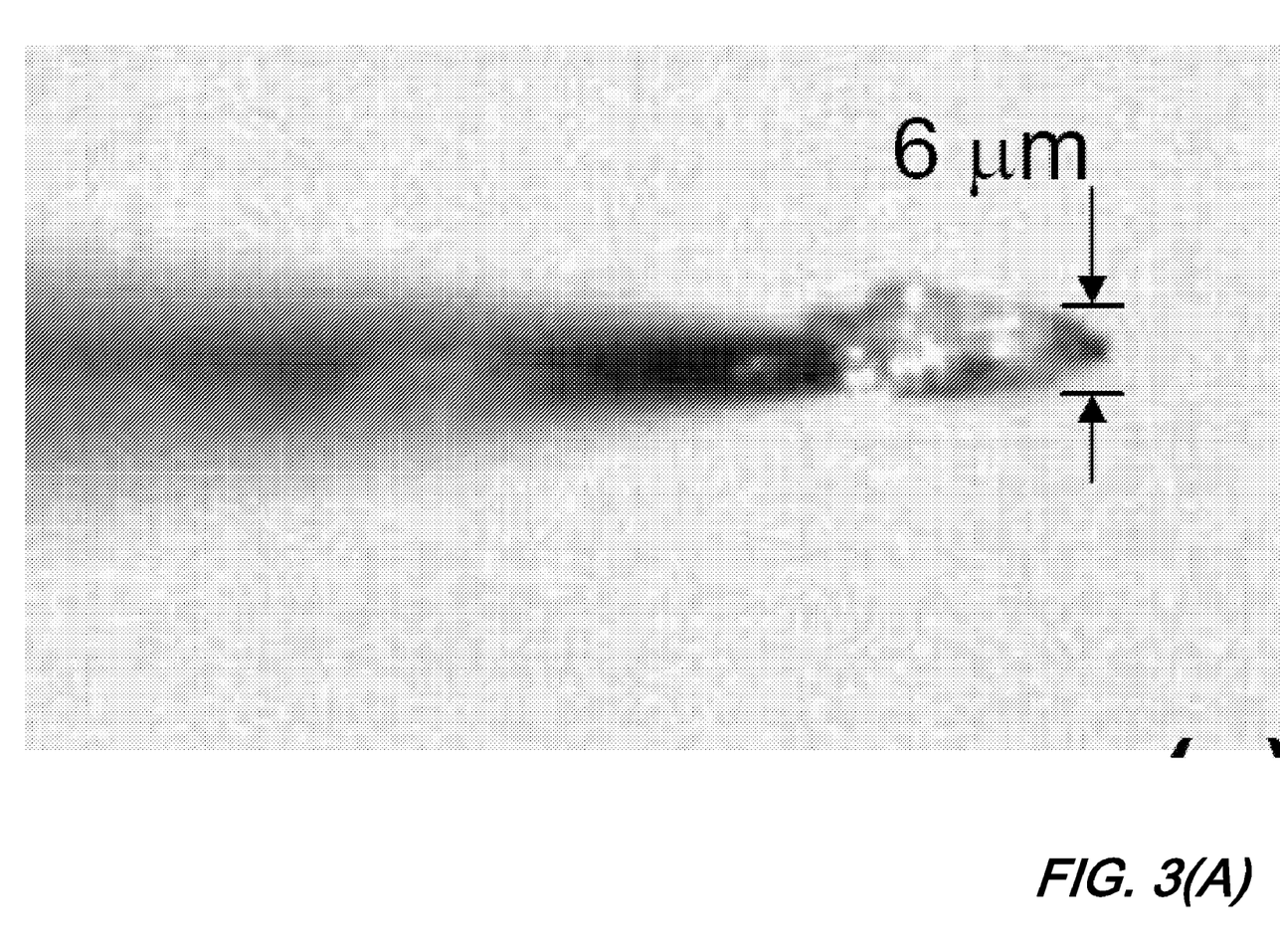
FIG. 3(a) is a schematic image showing a probe tip in the x-z plane.
Figure 3B:
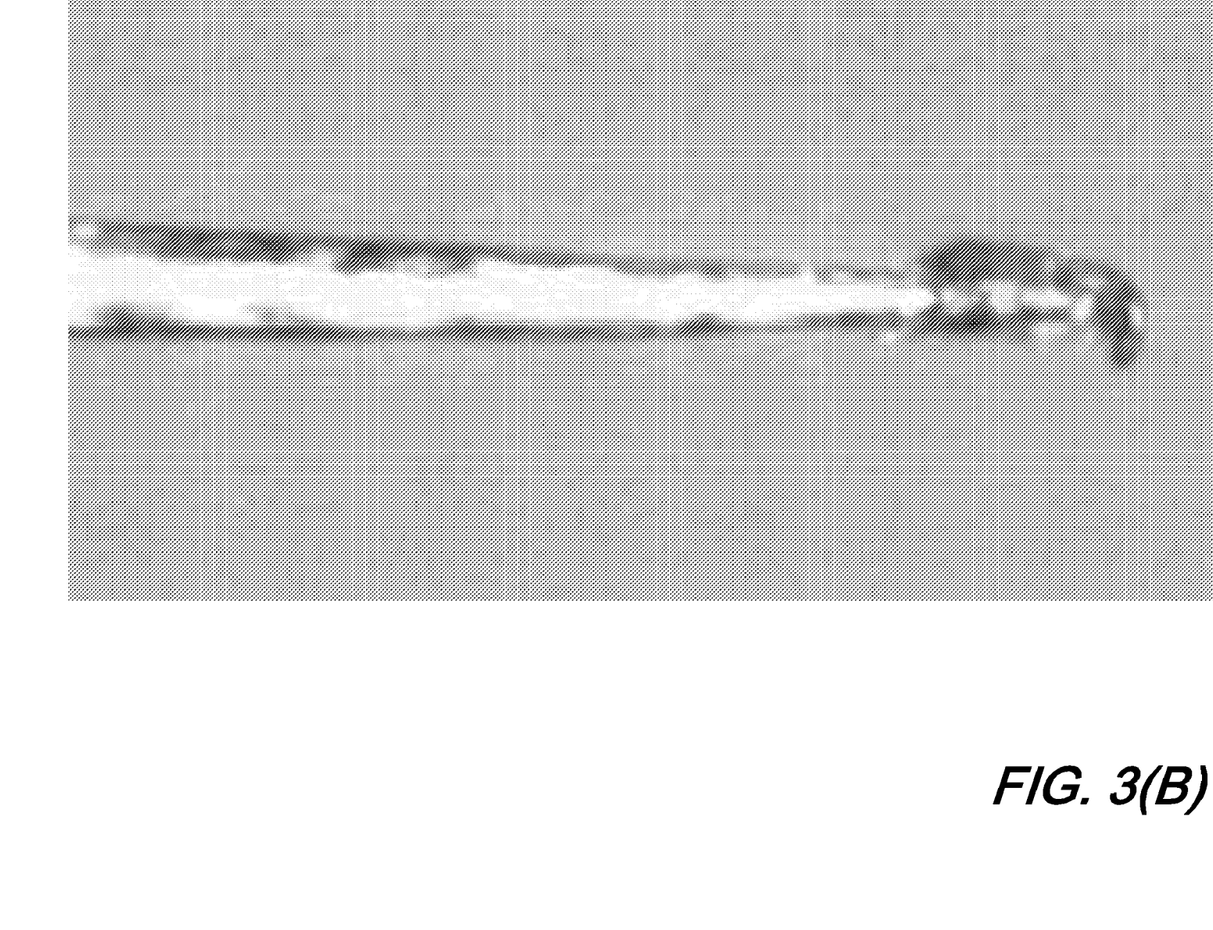
FIG. 3(b) is a schematic image showing the y-z plane.

A titanium probe needle with a tip size of 6×8 μm$^2$ (outer dimensions) was used to evaluate the structure. Schematic images of the tip of the probe from orthogonal points of view are shown in FIG. 3. To fully test the imaging capability of the structure, a smaller probe may be used. The tip of the probe needle is slightly larger than the central diffraction zone diameter, which is 5.4 μm.

Figure 4:
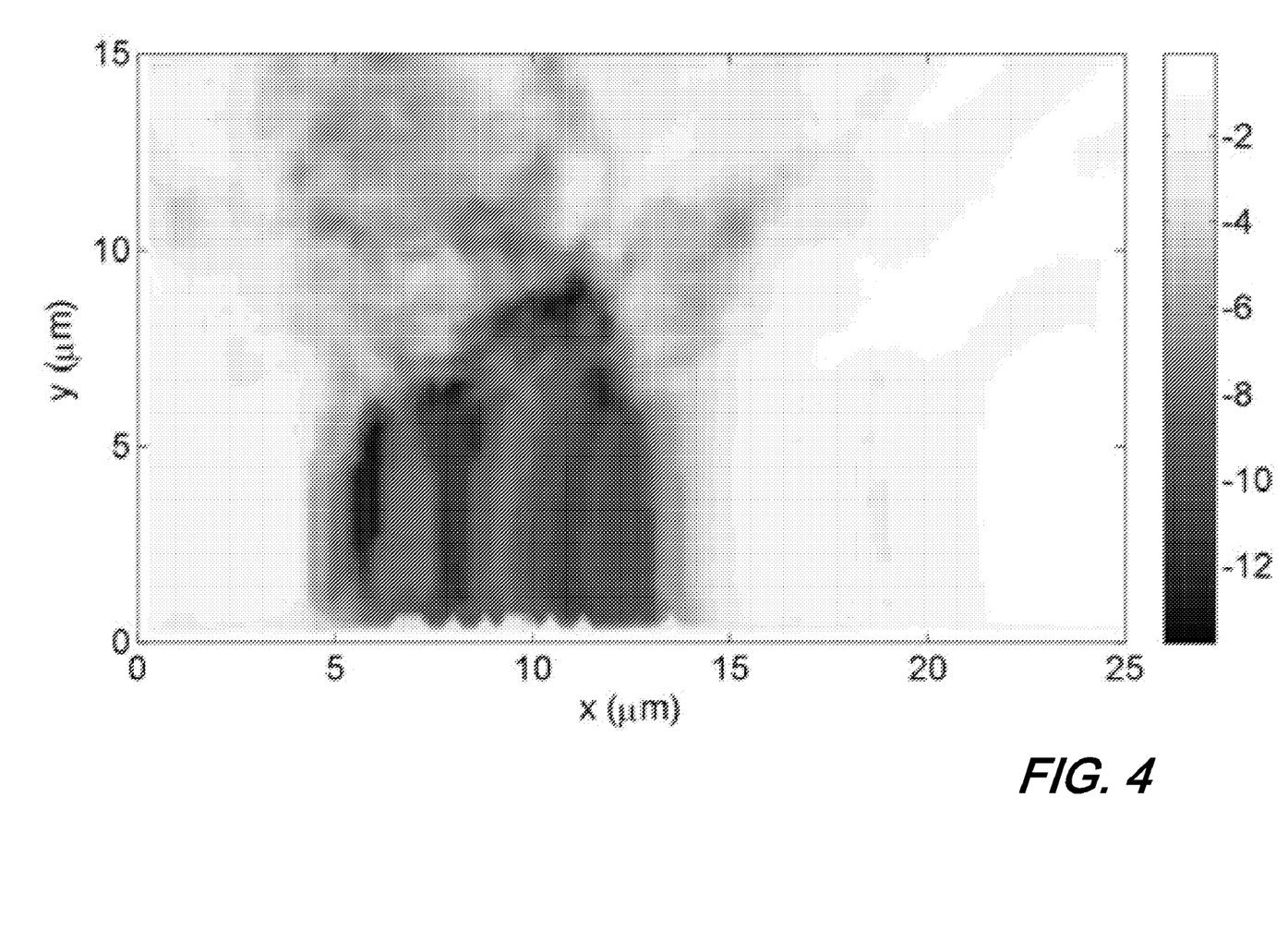
FIG. 4 shows the normalized transmissivity (dB) vs. probe position.

A fiber was connected to the flower input/output, and using an optical circulator an amplified spontaneous emission was launched from an erbium-doped fiber amplifier (center wavelength of 1545 nm) into the flower and detected the returned light using an optical power meter. The trench was filled with index matching oil. Three of the four thermooptic phase shifters were driven to maximize the transmission. The total insertion loss, including the circulator, is 8 dB The probe tip was lowered into the trench. Using piezoelectric transducers, the tip was moved in the x- and y-directions and a computer to record the transmissivity vs. x and y. The results are shown in FIG. 4. The trench walls are parallel to the x-axis, and unfortunately the trench was slightly offset from the coupler center causing the probe to hit the wall before it moved out of the focus in the negative y direction.

Figure 5:
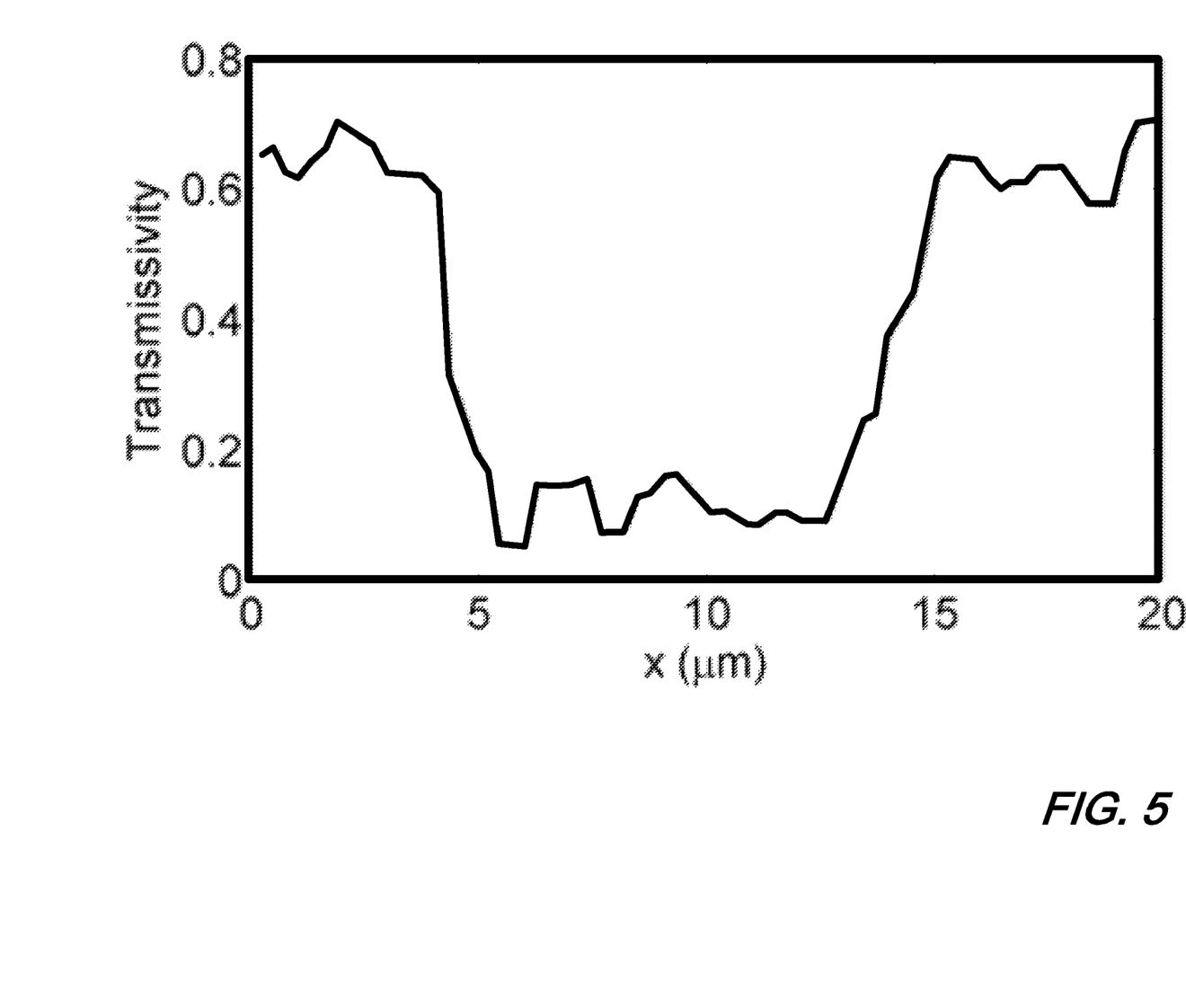
FIG. 5 is a plot showing the cross-section of the transmissivity (on a linear scale) from FIG. 4 along the x axis.

From this FIG. 4 one can see that the probe is successfully detected by the flower, with an increased attenuation up to 14 dB when the probe is near the coupler center. Although the probe is much bigger than a wavelength, transitions in the image that are significantly smaller than a wavelength may be observed. For example, FIG. 5 shows a cross section along the x axis. The transmissivity falls to half the background level in less than 0.3 wavelengths in the oil. Those skilled in the art will appreciate that such a sharp transition is not readily achievable in a conventional imaging arrangement.

Figure 6:
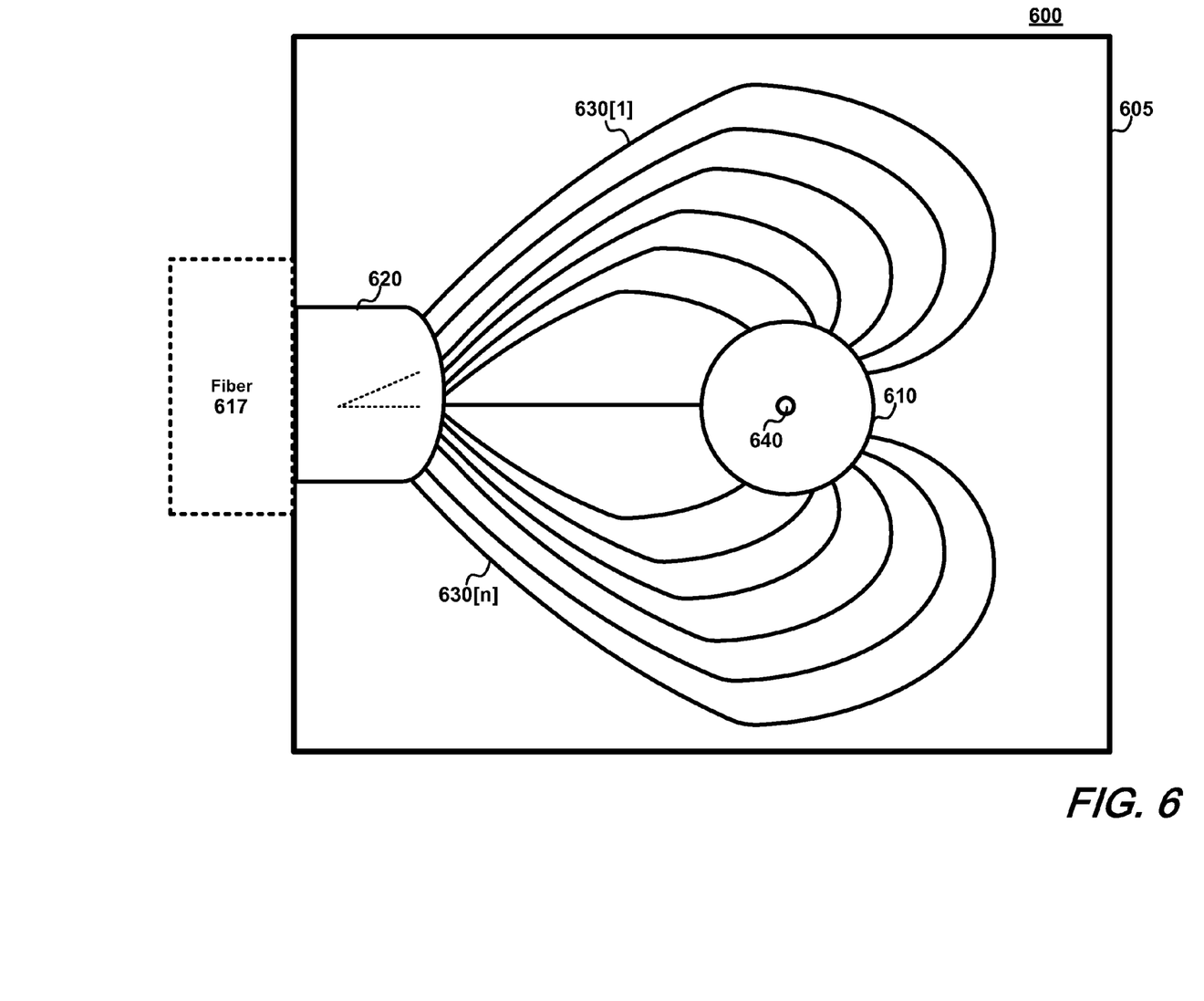
FIG. 6 is a schematic diagram of an alternative optical arrangement according to an aspect of the present invention.

Turning now to FIG. 6, there is shown an alternative imaging arrangement according to another aspect of the present invention. More particularly, imaging system 600 includes a 360° star coupler 610 optically coupled via a plurality of waveguide arms 630[1] . . . 630[n] to the output of star coupler 620. As shown in this FIG. 6, each of the elements may advantageously be integrated or otherwise fabricated on a common planar lightwave substrate 605.

Input/output to the star coupler 620 may be provided by optical fiber 617. By employing a sufficient number of waveguide arms 630[1] . . . 630[n], a focal spot may be produced at center aperture 640, which was shown previously to be positioned at substantially the center of the 360 star coupler 610. Preferably, at least 4 waveguide arms are employed its upward bound is only limited by they number of physical couplings which may be made to both the 360 star coupler 610 and the star coupler 620.

Operationally, light (not specifically shown) enters the apparatus via optical fiber 617 and then routed to waveguide arms 630[1] . . . 630[n] through the effect of star coupler 620 where it is directed to 360 star coupler 610. Upon entering 360 star coupler, the light is absorbed/scattered by substance positioned at aperture 640, and subsequently coupled back into waveguide arms 630[1] . . . 630[n] and guided back to star coupler 620 and redirected out of optical input/output fiber 617. In a preferred embodiment, the entire system 600 may advantageously be integrated onto a common substrate or chip, 605.

In this exemplary structure, by employing a sinusoidal chirp in the waveguide arms (grating arm lengths) the focus of the light in the 360° star coupler may be steered in a straight line with changes in wavelength. Alternatively, the focus may be moved in another direction either by adding another chirp or by employing a sinusoidal chirp of Rα and moving the input focus. As can be appreciated, when a sample is positioned within the aperture, it may be within an index matched material, or alternatively flowing through a tube having a desirable index. Light exiting the structure may be measured and sample plots derived from that exiting light. With such a flowing tube arrangement, a continuous run of sample(s) may be made through the tube while collecting optical spectra therefrom or a simple count of particles may be obtained.

Figure 7:
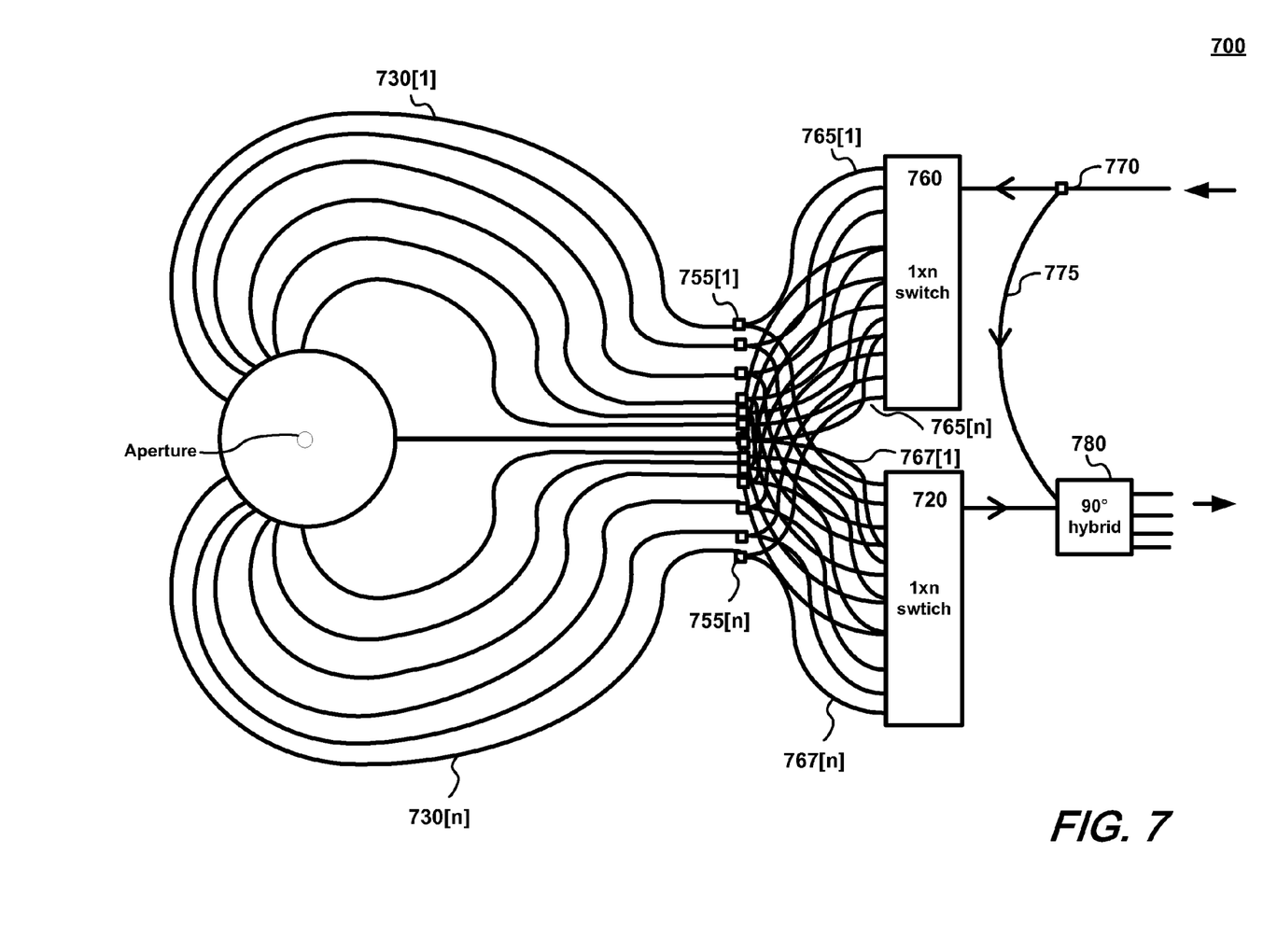
FIG. 7 is a schematic diagram of another alternative optical arrangement according to an aspect of the present invention.

Turning now to FIG. 7, there is shown an alternative embodiment of an imaging apparatus 700 according to yet another aspect of the present invention. In this embodiment, 360 star coupler 710 having a central aperture 740 is optically connected to a series of 1×2 couplers 755[1] . . . 755[n] by a number of waveguide arms 730[1] . . . 730[n]. The 1×2 couplers 755[1] . . . 755[n] are in turn optically coupled to of 1×n switches 760[1], 760[2] by waveguide sets 765[1] . . . 765[n] and 767[1] . . . 767[n], respectively.

Accordingly, when a sample is positioned within the aperture 740, light entering the system 700 via input 790 is directed to the aperture 740 through the effect of input 1×n switch 760[1], 1×2 couplers 765[1] . . . 765[n] and waveguide arms 730[1] . . . 730[n].

Light scattered or otherwise transmitted by sample in aperture 740 is then redirected back via waveguide arms 730[1] . . . 730[n], 1×2 couplers 755[1] . . . 755[n], waveguides 7671] . . . 767[n] to a second 1×n switch 760[2] and then output at waveguide/fiber 792. Advantageously, a 1×2 coupler 770 in conjunction with waveguide/fiber 775 and 90-degree hybrid 780 facilitates differential measurements between input and output.

Figure 8:
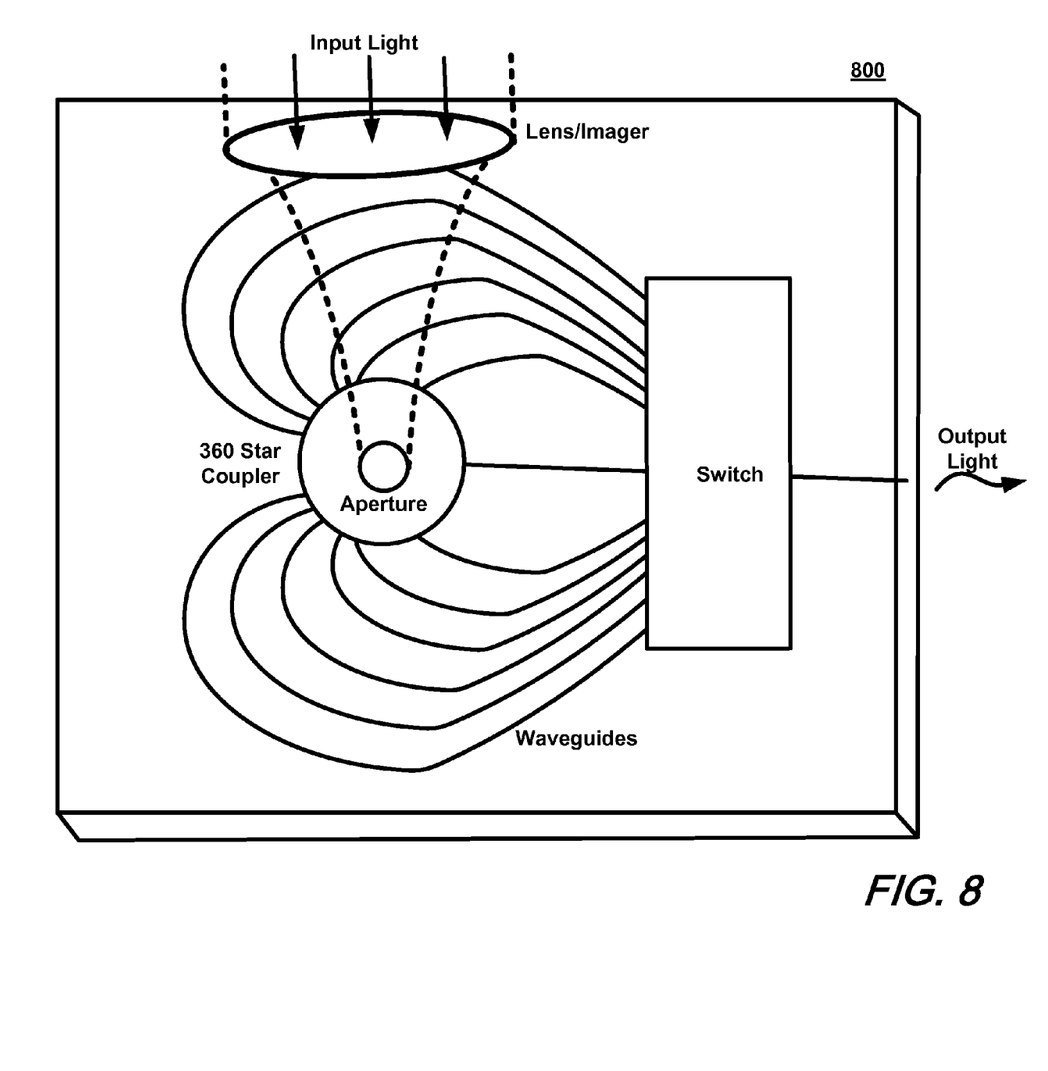
FIG. 8 is a schematic diagram of another alternative optical arrangement according to an aspect of the present invention.
Figure 9:
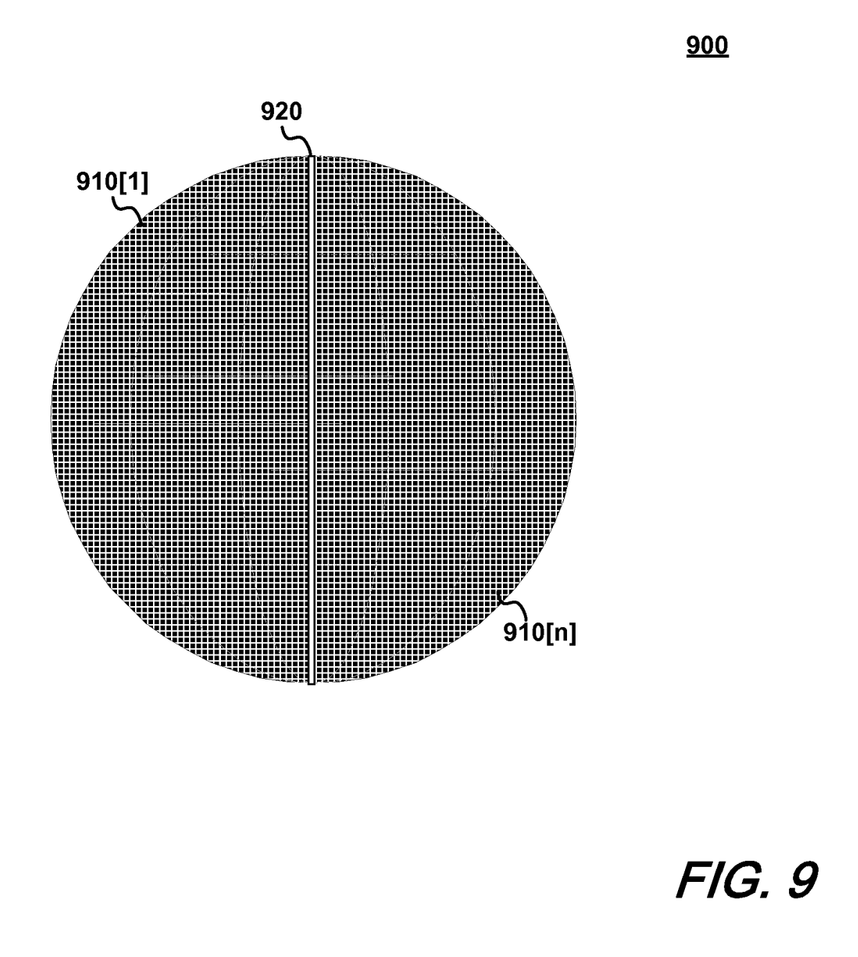
FIG. 9 is a schematic diagram of a spherical optical arrangement according to an aspect of the present invention.

Yet another embodiment is shown in FIG. 8. In this embodiment, the light source is placed above (or below) the 360° star coupler and is focused into the aperture. Some of the light that is scattered or generated by optically pumped fluorescence (if such fluorescent molecules are placed in the aperture) is captured by the waveguides of the 360° star coupler and is routed to either a coupler or a switch and then is routed off chip to a photodetector (optionally through an optical filter first). The coupler could be one large coupler or a tree arrangement of smaller couplers. By using the switch or by using different path lengths of all the waveguides and the coupler, one can determine the amplitude and possibly the phase in each arm, allowing one to use inverse scattering theory to reconstruct the image of the object in the 360 star° coupler Finally, the 360° star coupler can be extended to 3 dimensions, creating a 4π-steradian coupler. Turning to FIG. 9, there is shown such a spherical coupler 900 Such a coupler looks like a sphere with waveguides sticking out normal to the sphere surface 910[1] . . . 910[N]. For simplicity, the waveguides are shown as "dots" on the surface of the sphere. Advantageously, it can be made in a material such as glass using a method such as femtosecond laser waveguide writing, which allows 3-dimensional waveguide structures to be formed. The advantage of a 4π-steradian coupler is that all 3 dimensions of an object could be imaged. The waveguides could be collected in a coupler or switch (which could be 2 dimensional), as in the 2-dimensional case. As with those earlier described 360 degree couplers, an aperture 920 running through a central axis of the sphere permits the placement of a sample at substantially the center of the sphere for imaging/spectroscopic analysis.

Summarizing, a 360 star coupler permits the construction of 2-D imaging arrangement using a PLC and a 4p-steradian coupler permits the construction of a 3-D imaging arrangement using 3-D integrated optics, thereby permitting the detection of subwavelength features with high sensitivity. It operates in the far field and works over a large wavelength range.

At this point, while we have discussed and described the invention using some specific examples, those skilled in the art will recognize that our teachings are not so limited. For example, the structures shown may employ various number(s) of optical couplers, inputs/outputs etc. They may be integrated onto a single substrate, or fabricated from individual components. Accordingly, the invention should be limited only by the scope of the claims attached hereto.

The invention claimed is:

1. An optical apparatus comprising:
   a single, slab waveguide that is substantially circular in-shape; and
   a plurality of waveguides optically coupled to the single, circular slab waveguide such that each quadrant of the single, circular slab waveguide has at least a portion of one of the waveguides physically connected thereto;
   wherein all of the waveguides are optically coupled to one another and all of the waveguides are coplanar and all of the waveguides have a focal point that is substantially at the center of the slab waveguide.

2. The optical apparatus of claim 1 wherein the number of waveguides optically coupled to the circular slab waveguide is n, wherein $n \geq 4$.

3. The optical apparatus of claim 2 wherein the circular slab waveguide includes an aperture positioned substantially at the center of the circle.

4. The optical apparatus of claim 3 wherein each waveguides is spaced substantially equidistant from its adjacent waveguides around the perimeter of the circular slab waveguide.

5. The optical apparatus of claim 4 wherein n is an even number $\geq 32$.

6. An optical apparatus comprising:
   a 360 degree star coupler comprising a single, slab waveguide that is substantially circular in-shape, said single circular slab waveguide having a plurality of optical waveguides optically coupled thereto such that each quadrant of the single, circular slab waveguide has at least a portion of one of the waveguides physically connected thereto, wherein all of the waveguides are optically coupled to one another and all of the waveguides are coplanar and and all of the waveguides have a focal point that is substantially at the center of the slab waveguide; and
   a star coupler optically connected to the 360 degree star coupler.

7. The optical apparatus of claim 6 wherein said 360 degree star coupler further comprises an aperture formed at substantially the center of the 360 degree star coupler.

8. The optical apparatus of claim 7 wherein said star coupler comprises at least one input/output port at one side and a plurality of input/output ports at an opposite side.

9. The optical apparatus of claim 8 wherein the star coupler and the 360 degree star coupler are connected by a plurality of optical waveguides.

10. The optical apparatus of claim 9 wherein the star coupler, the plurality of waveguides and the 360 degree star coupler are integrated onto a single planar chip.

11. A method of operating an optical apparatus, said apparatus comprising:
    a 360 star coupler comprising a single, slab waveguide that is substantially circular in-shape, said single circular slab waveguide having a plurality of optical waveguides optically coupled thereto, such that each quadrant of the single, circular slab waveguide has at least a portion of one of the waveguides physically connected thereto,
    wherein all of the waveguides are optically coupled to one another and all of the waveguides are coplanar and all of the waveguides have a focal point that is substantially at the center of the slab waveguide;
    said method comprising the steps of:
    introducing light into the 360 star coupler via one or more of the waveguides; and
    collecting light exiting the 360 star coupler.

12. The method of claim 11, wherein said 360 star coupler further comprises:
    an aperture positioned at substantially the center of the 360 star coupler;
    said method further comprising the steps of:
    positioning a sample within the aperture such that at least a portion of the introduced light strikes the sample and subsequently exits the 360 star coupler.

13. The method of claim 12 wherein said sample is part of a sample which flows through the aperture.

14. The method of claim 12 wherein said apparatus further comprises:
    a sample tube positioned such that at least a portion of the tube is within the aperture;
    said method further comprising the steps of:
    flowing the sample through the sample tube.

15. An optical apparatus comprising:
    a 360 degree star coupler comprising a single slab waveguide that is substantially circular in-shape, said slab waveguide having n input/output ports physically connected thereto such that each quadrant of the single, circular slab waveguide has at least one of the ports, wherein all of the n input/output ports are optically coupled one another and all of the ports are coplanar with the slab waveguide and all of the ports have a focal point that is substantially at the center of the slab waveguide;
    an input 1×n optical switch having an input port and n output ports;
    an output 1×n optical switch having n input ports and 1 output port;
    n 1×2 couplers optically connecting the n output ports of the input optical switch and the n input ports of the output optical switch to the n input/output ports of the 360 degree star coupler.

16. The optical apparatus of claim 15 wherein said 360 degree star coupler further comprises an aperture formed at substantially the center of the 360 degree star coupler.

17. The optical apparatus of claim 16 further comprising:
    a 1×2 coupler having an input and 2 outputs wherein one of the outputs is optically connected to the input of the input optical switch;
    a 90 degree hybrid having at least 2 inputs and one or more outputs and one of the inputs is optically connected to the output of the output optical switch and a second input is optically connected to the second output of the 1×2 coupler connected to the input of the input optical switch.

18. The optical apparatus of claim 16 further comprising a sample tube for positioning a sample within the aperture.

19. The optical apparatus of claim 1 wherein a light source is placed above or below the slab waveguides and is focused onto the slab waveguides.

20. An optical apparatus comprising:
an optical waveguide that is substantially spherical in-shape; and
a plurality of waveguides optically coupled to the spherical waveguide such that each steradian of the spherical waveguide has at least a portion of one of the waveguides physically connected thereto;
wherein all of the waveguides are optically coupled to one another through the effect of the spherical waveguide and all of the waveguides have a focal point that is substantially at the center of the spherical waveguide.

21. The optical apparatus of claim 20 wherein the spherical waveguide includes an aperture positioned substantially along a central axis of the spherical waveguide such that a sample may be positioned at substantially the center of the spherical waveguide.

22. The optical apparatus of claim 20 wherein each of the plurality of waveguides is spaced substantially equidistant from its adjacent waveguides around the outer spherical surface of the spherical waveguide.

23. An optical apparatus comprising:
a single, planar slab waveguide substantially circular in shape; and
a plurality of waveguides physically connected to the slab waveguide such that each quadrant of the slab waveguide has at least a portion of one of the waveguides physically connected thereto;
wherein all of the waveguides connected to the slab waveguide have a focal point which is substantially at the center of the slab waveguide and all of the waveguides connected to the slab waveguide are optically coupled to one another through the effect of the slab waveguide.

24. The optical apparatus of claim 23 wherein all of the waveguides connected to the single, slab waveguide are equally spaced in angle from adjacent waveguides.

25. The optical apparatus of claim 23 wherein all of the waveguides connected to the single, slab waveguide are positioned such that lines overlaying said waveguides intersect at the center of the slab waveguide.

26. The optical apparatus of claim 23 wherein all of the waveguides connected to the single, slab waveguide are positioned such that lines overlaying said waveguides intersect at the center of the slab waveguide.

27. The optical apparatus of claim 23 wherein the single, circular slab waveguide includes an aperture positioned substantially at the center of the circle.

28. An optical apparatus comprising:
an optical waveguide that is substantially spherical in-shape; and
a plurality of waveguides physically connected and optically coupled to the spherical waveguide such that each steradian of the spherical waveguide has at least a portion of one of the waveguides physically connected thereto;
wherein all of the waveguides connected to the spherical waveguide have a focal point which is substantially at the center of the spherical waveguide and are optically coupled to one another through the effect of the spherical waveguide.

29. The optical apparatus of claim 28 wherein the spherical waveguide includes an aperture positioned substantially along a central axis of the spherical waveguide such that a sample may be positioned at substantially the center of the spherical waveguide.

30. The optical apparatus of claim 28 wherein all of the waveguides connected to the spherical waveguide are equally spaced in angle from adjacent waveguides.

31. The optical apparatus of claim 28 wherein all of the waveguides connected to the spherical waveguide are positioned such that lines coaxial with said waveguides intersect at the center of the spherical waveguide.

* * * * *